US012311571B1

(12) United States Patent
Van Kleef

(10) Patent No.: US 12,311,571 B1
(45) Date of Patent: May 27, 2025

(54) APPARATUS AND METHOD FOR TOASTING OF BARRELS

(71) Applicant: Ericus A Van Kleef, Newburgh, IN (US)

(72) Inventor: Ericus A Van Kleef, Newburgh, IN (US)

(*) Notice: Subject to any disclaimer, the term of this patent is extended or adjusted under 35 U.S.C. 154(b) by 599 days.

(21) Appl. No.: 17/725,209

(22) Filed: Apr. 20, 2022

Related U.S. Application Data

(60) Provisional application No. 63/177,062, filed on Apr. 20, 2021.

(51) Int. Cl.

| | |
|---|---|
| ***B27H 5/08*** | (2006.01) |
| ***F26B 3/30*** | (2006.01) |
| ***F26B 11/04*** | (2006.01) |
| ***H05B 3/00*** | (2006.01) |

(52) U.S. Cl.
CPC ................. *B27H 5/08* (2013.01); *F26B 3/30* (2013.01); *H05B 3/0038* (2013.01); *F26B 11/04* (2013.01); *F26B 2210/16* (2013.01); *H05B 2203/032* (2013.01)

(58) Field of Classification Search
USPC .......................................................... 432/224
See application file for complete search history.

(56) References Cited

U.S. PATENT DOCUMENTS

| | | | | |
|---|---|---|---|---|
| 2,185,206 A * | 1/1940 | Little | C12G 3/07 | 217/88 |
| 2,507,685 A * | 5/1950 | Wilde | B27H 5/08 | 432/232 |
| 5,630,265 A * | 5/1997 | Stone | C12L 11/00 | 29/402.21 |
| 12,072,147 B1 * | 8/2024 | Vankleef | B27H 5/08 | |
| 2010/0124725 A1 * | 5/2010 | Waterman | H05B 3/44 | 432/224 |
| 2011/0203093 A1 * | 8/2011 | Dollinger | B27H 5/08 | 29/402.06 |

FOREIGN PATENT DOCUMENTS

| | | | |
|---|---|---|---|
| ES | 2220196 A1 * | 12/2004 | B27H 5/08 |

OTHER PUBLICATIONS

Popular_Science_infrared_radiation_can_fine_tune_the_taste_of_whiskey.pdf (Year: 2016).*
World_Cooperage_II_barrel_toasting_with_infrared_heat.pdf (Year: 2020).*
World_Cooperage_Meet_the_Infrared_Series.pdf (Year: 2020).*
ES-2220196-A1 English translation (Year: 2004).*

* cited by examiner

*Primary Examiner* — Steven S Anderson, II
*Assistant Examiner* — Kurt J Wolford
(74) *Attorney, Agent, or Firm* — Gary K Price

(57) ABSTRACT

An apparatus for toasting the inside surface of a barrel. The apparatus generally includes a base member and an arm member. The arm member includes a central support member and at least one radially disposed electric infrared heater configured to heat the inside surface of the barrel evenly, and an extending arm disposed at an upper-most end of the arm member such that in application, the inside surface of the barrel rests on the extending arm and not the heater. The arm member includes at least one heater reflector plate disposed between each of the at least one infrared heaters and the central support member. The at least one heater reflector plate requires having a smooth, reflective surface for increasing the intensity of heat emanating from the respective infrared heater.

17 Claims, 2 Drawing Sheets

APPARATUS AND METHOD FOR TOASTING OF BARRELS

CROSS REFERENCES TO RELATED APPLICATIONS

U.S. Provisional Application for Patent No. 63/177,062, filed Apr. 20, 2021, with title "Apparatus and Method for Toasting of Barrels" which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not Applicable.

BACKGROUND OF THE INVENTION

1. Field of the Invention

The present invention is directed to an apparatus for toasting a wooden barrel. More particularly, the apparatus is configured for toasting the inside surface of the barrel.

2. Brief Description of Prior Art

In the production of barrel staves, oak trees are harvested and the wood is cut or split into shape to be stored and dried for varying lengths of time. An oak barrel is formed from these dried staves.

Oak wood is used for barrels as it contains certain aromatic compounds desirable for alcohols stored within the barrels. These compounds provide the alcohol with qualities such as vanilla, smoky and spicy flavors and aromas. The toasting process exposes more of these desirable flavors and aromas in the oak by carmelising sugars, reducing tannin and bitterness, and creating aromatic aldehydes.

The toasting process typically involves placing a barrel over a heat source, generally a furnace, for a particular length of time. The heat source is applied to the interior surface of the barrel to alter the chemical composition of the oak wood, bringing out the different flavors and aromas as discussed. The toasting intensity, or temperature of the target surface, is of particular importance in producing these compounds and for consistency, the temperature needs to be monitored.

The traditional methods of toasting are not highly uniform or reproduceable. The cooper needs to use his/her expertise to build a fire to what is perceived as the desired temperature and place the barrel over the fire for a desired length of time. The cooper may then rotate the barrel about its central axis, or flip the barrel over in order to maintain the desired heat for consistent barrel toasting and chemical alteration. However, if the cooper subjects the barrel surface to too much heat in one particular area by not turning or flipping the barrel over, the wood can burn and form undesirable blisters. Conversely, too little heat results in not enough flavors and aromas being extracted.

As such, existing toasting apparatus and methods have a number of drawbacks, including but not limited to the following: lack of uniformity, current heating methods are often not capable of producing uniform heat over the entire inside surface of the barrel; lack of repeatability, temperature is not easily controllable (in particular when using an open flame), and therefore repeating a toasting process in exactly the same way as the previous toast is almost impossible.

Accordingly, there is a need for a toasting apparatus that provides uniform and controlled heat over the entire inside surface of the barrel; and that is repeatable such that the current toasting is the same as the previous barrel toasting. The present invention satisfies these objectives and more.

SUMMARY OF THE INVENTION

The present invention is directed to an apparatus for toasting the inside surface of a wooden barrel. The apparatus generally includes a base member and an arm member.

The arm member includes a central support member and at least one radially disposed electric infrared heater configured to heat the inside surface of the barrel. In application, the arm member is horizontally disposed inside the barrel and the base member is configured to selectively rotate the barrel around the stationary arm member. This motion is repeated throughout the duration of toasting.

The apparatus includes an extending arm positioned parallel to the arm member such that in application, the inside surface of the barrel rests on the extending arm and not on the at least one infrared heater.

The arm member further includes at least one heater reflector plate disposed between each of the at least one infrared heaters and the central support member. The heater reflector plate is configured with a smooth, reflective surface for increasing the intensity of heat emanating from the respective infrared heater.

In application, the present apparatus is adapted to place the arm member horizontally inside the barrel so that the heaters are positioned in a horizontal configuration inside the barrel. The angled shape of the heater reflector plate ensures that heat is confined to only a predetermined radial portion of the inside surface of the barrel.

DESCRIPTION OF THE PREFERRED EMBODIMENT

Figure 1:
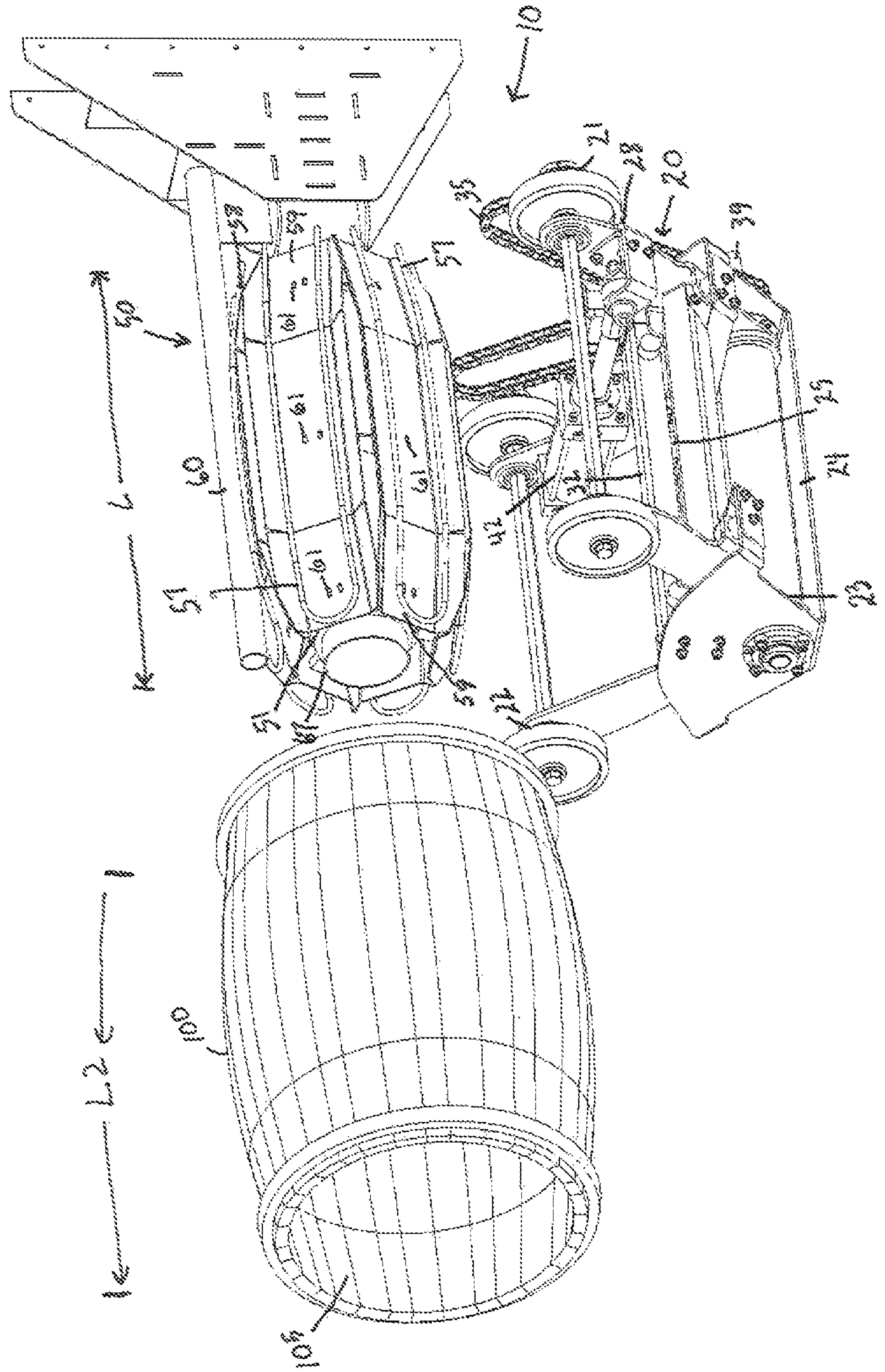
FIG. 1 is a side view of an apparatus for toasting an inside surface of an illustrated prior art wooden barrel.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The apparatus of the present invention is generally directed to an apparatus for toasting the inside surface of a wooden barrel. The apparatus provides uniform and controlled heat over the entire surface of the barrel. As will be discussed, the barrel toasting apparatus as disclosed consists of components configured and correlated with respect to each other so as to attain the desired objective.

In accordance with the present invention, there is provided an apparatus designated as numeral 10 for toasting the inside surface 105 of a barrel 100 that generally includes a base member 20 and an arm member 50. The arm member

50 may be appropriately mounted to a stand (not shown) or to a wall for example with brackets 17.

As will be discussed, the base member 20, in application, is configured to selectively rotate the barrel 100 while the arm member 50 remains stationary within the barrel 100. In some instances, the base member 20 includes a spindle shaft assembly 21 with a right-hand side assembly 22 and a left-hand side assembly 23, a wheel pivot bracket 24, a drive shaft 25, a tensioner bracket 28, a center bridge 32, a roller chain 35, a roller chain sprocket 39, and an air cylinder 42, or the like, to facilitate the rotation of the barrel 100. The base member 20 generally supports the barrel 100 in a horizontal position and is configured to selectively rotate the barrel 100 while the arm member 50 remains stationary inside the barrel 100.

Figure 2:
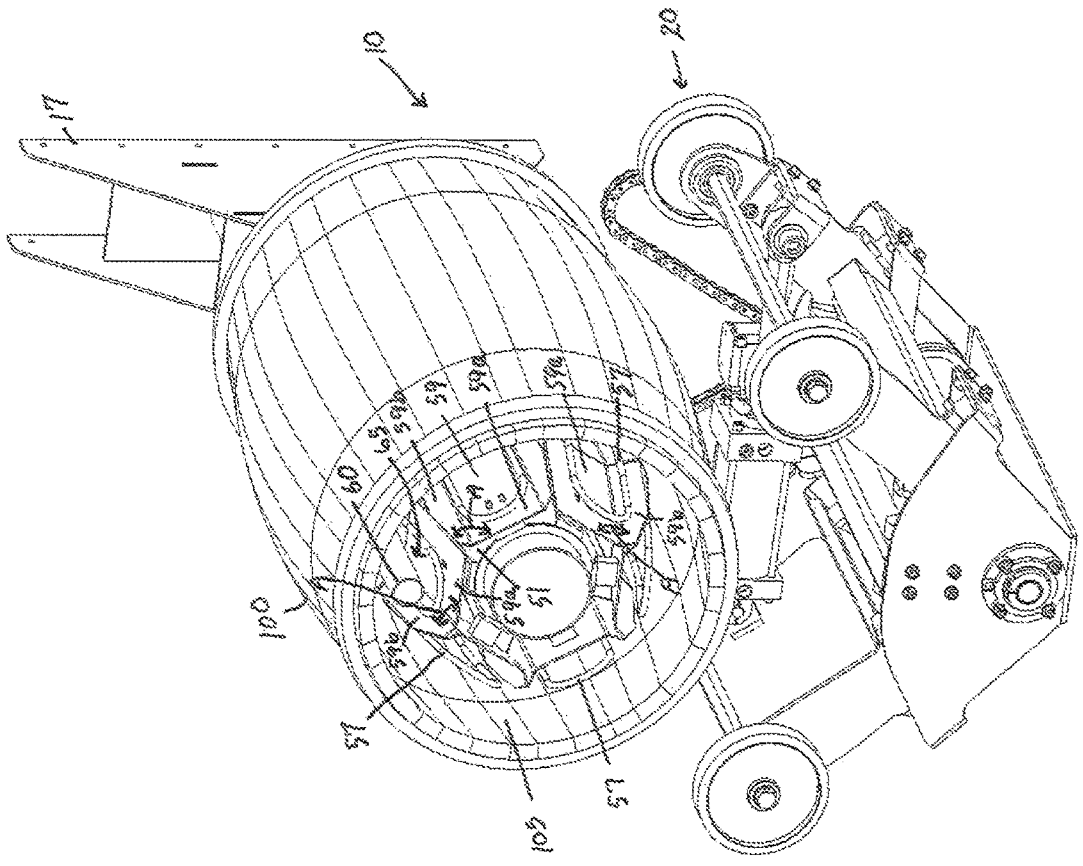
FIG. 2 is an end view of the toasting apparatus of FIG. 1, when the arm member is placed inside the wooden barrel ready for use.

The arm member 50 as shown includes a central support member 51 and at least one radially disposed electric infrared heater 57 which is configured to heat the inside surface 105 of the barrel 100 evenly. For example, in the embodiment shown, the arm member 50 includes six heaters 57. As will be understood, in application, the base member 20 is configured to selectively rotate the barrel 100 clockwise and/or counter-clockwise while the stationary arm member 50 is positioned inside the barrel 100 (see FIG. 2), and as such, the arm member 50 may be substantially circular to mimic the interior of the barrel. This motion is repeated throughout the duration of toasting.

As shown, the arm member 50 further includes an extending arm 60 that is positioned parallel to the length L of the arm member 50 and is the upper-most end 58 of the arm member 50 such that in application, the inside surface 105 of the barrel 100 rests on the extending arm 60 and not on the at least one infrared heater 57. Positioning of the extending arm 60 as described therefore results in a defined selective spacing 65 (see FIG. 2) between inside surface 105 and the at least one infrared heater 57.

Critical to the present invention, the arm member 50 further includes at least one heater reflector plate 59 disposed between each of the at least one infrared heaters 57 and the central support member 51. As such, there is one heater reflector plate 59 disposed adjacent each infrared heater 57.

In the preferred embodiment, each of the at least one heater reflector plates 59 is mirror polished stainless steel requiring a smooth, reflective surface for increasing the intensity of heat emanating from the respective infrared heater 57.

As shown, each heater reflector plate 59 may be attached to the central support member 51 with spacer brackets 61. Preferably, the approximate ends of the heater reflector plate 59 and the approximate center of the heater plate 59 are attached using the spacer bracket 61, causing a spacing of between % inch and 3 inches, preferably about 1 inch between the central support member 51 and the heater reflector plate 59.

The heater reflector plate 59 further defines angles A configured to more evenly reflect the infrared heat described. More particularly, each heater reflector plate 59 includes a planer surface 59*a* and may further include an edge 59*b* where each edge 59*b* is disposed at an angle A to the planer surface 59*a*. An acceptable angle A is between 5 degrees to 60 degrees, preferably about 30 degrees to the planar surface 59*a*.

In a typical barrel construction process, toasting entails bringing the temperature of the wood to a selected temperature, and maintaining the wood at that temperature for a selected period of time. The present apparatus 10 is adapted to place the arm member 50 horizontally inside the headless barrel 100 as illustrated, so that the heaters 57 are positioned in a horizontal configuration inside the barrel 100. As should be understood, each heater 57 is configured to direct heat outwardly towards the inside surface 105 for toasting.

The angled shape of the heater reflector plate 59 as discussed, ensures that heat is confined to only a predetermined radial portion of the inside surface 105 that extends the entire length (height) of the barrel. As should now be understood, in order to achieve a uniform toast throughout the interior of the barrel, the length of the heating element 57 and heater reflector plate 59 are approximately the same length as the barrel length, designated as L2.

As illustrated, the arm member 50 may include multiple heaters 57, each with reflector plate 59 as described, arranged to basically cover the outer surface of the arm member 50, which may allow for thorough and even toasting of the interior 105 of the barrel 100. However, this example is not intended to be limited, as any arrangement of infrared heaters 57 as described, capable of toasting the barrel 100 may be used.

Uniformity is achieved because of the configuration of each of the heaters 57 and the heater reflector plate 59. The fact that they confine heat to a predetermined radial portion of the inside surface 105 as the barrel 100 is rotated, ensures an even spread of heat and prevents both blistering and under-toasting.

Repeatability is possible because the intensity of the heaters, as well as the heating time is controllable, which means that once a particular type of barrel has been toasted once, the same settings can be used again for a similar type of barrel.

As mentioned, the barrel 100 undergoes rotation while the arm member 50 is inside the barrel 100. This rotation of the barrel may be achieved using any suitable driving means. A preferred way is using the illustrated base member 20.

According to the preferred embodiment, the apparatus 10 may further include at least one temperature sensor 67, integral with the arm member 50, the temperature sensor being directed towards an inner side wall of the barrel 100 so as to measure the surface temperature of the inside surface 105 at a distance. The preferred temperature sensor is an infrared temperature sensor.

Although the above description contains many specificities, these should not be construed as limiting the scope of the invention but as merely providing illustrations of some of the presently preferred embodiments of this invention. As such, it is to be understood that the present invention is not limited to the embodiments described above, but encompasses any and all embodiments within the scope of the claims.

It would be obvious to those skilled in the art that modifications may be made to the embodiments described above without departing from the scope of the present invention. Thus the scope of the invention should be determined by the appended claims in the formal application and their legal equivalents, rather than by the examples given.

I claim:

1. An apparatus for toasting the interior of a barrel, said apparatus comprising:

a base member that supports a barrel in a horizontal position and is configured to rotate the barrel in said horizontal position, an arm member that includes a central support member and at least one radially disposed electric infrared heater configured to heat an interior surface of the barrel, and wherein the base member is configured to selectively rotate the barrel while the arm member remains stationary inside the barrel, an extending arm that is positioned parallel to a length of the arm member at an upper-most end of the arm member, and wherein the interior surface of the barrel rests on the extending arm such that a selective spacing is defined between the interior surface and the infrared heater, at least one heater reflector plate attached to the central support member and disposed between the at least one infrared heater and the central support member, and wherein the at least one heater reflector plate is attached to the central support member using a spacer bracket, and wherein the at least one infrared heater defines a first length, and the at least one heater reflector plate defines a second length.

2. The apparatus of claim 1, wherein the at least one heater reflector plate is a mirror polished stainless steel requiring a smooth, reflective surface.

3. The apparatus of claim 1, where the spacer bracket causes a spacing between the central support member and the at least one heater reflector plate.

4. The apparatus of claim 1, wherein the at least one heater reflector plate comprises a planar surface and upper and lower edges where each upper and lower edge is disposed at an angle to the planar surface.

5. The apparatus of claim 1, further including at least one temperature sensor integral with the arm member.

6. The apparatus of claim 5, wherein the temperature sensor is directed towards an inner side wall of the barrel so as to measure the surface temperature of the interior surface at a distance.

7. The apparatus of claim 6, wherein the temperature sensor is an infrared temperature sensor.

8. An apparatus for toasting the interior of a barrel, said apparatus comprising:

a base member that supports a barrel in a horizontal position and is configured to rotate the barrel in said horizontal position, an arm member including a central support member and a radially disposed electric infrared heater configured to heat an interior surface of the barrel, and wherein the base member is configured to selectively rotate the barrel while the arm member remains stationary inside the barrel, and wherein the interior surface of the barrel rests on an extending arm causing a space between the interior surface and the infrared heater, a heater reflector plate attached to the central support member and disposed between the infrared heater and the central support member.

9. The apparatus of claim 8, wherein the heater reflector plate is a mirror polished stainless steel requiring a smooth, reflective surface.

10. The apparatus of claim 8, wherein the heater reflector plate is attached to the central support member using a spacer bracket.

11. The apparatus of claim 10, where the spacer bracket causes a spacing between the central support member and the heater reflector plate.

12. The apparatus of claim 8, wherein the heater reflector plate comprises a planar surface and upper and lower edges where each upper and lower edge is disposed at an angle to the planar surface.

13. The apparatus of claim 8, further including at least one temperature sensor integral with the arm member.

14. The apparatus of claim 13, wherein the temperature sensor is directed towards an inner side wall of the barrel so as to measure the surface temperature of the interior surface at a distance.

15. The apparatus of claim 14, wherein the temperature sensor is an infrared temperature sensor.

16. An apparatus for toasting the interior of a barrel, said apparatus comprising:

an arm member that includes a central support member and at least one radially disposed electric infrared heater configured to heat an interior surface of a barrel, and wherein the arm member remains stationary inside the barrel, and wherein the interior surface rests on an extending arm causing a space between the interior surface and the infrared heater, at least one heater reflector plate attached to the central support member and disposed between the at least one infrared heater and the central support member, and wherein the at least one infrared heater defines a first length, and the at least one heater reflector plate defines a second length.

17. The apparatus of claim 16, further including a base member that supports the barrel in a horizontal position and is configured to rotate the barrel in said horizontal position such that the base member rotates the barrel while the arm member remains stationary inside the barrel.

* * * * *